Patented Sept. 26, 1922.

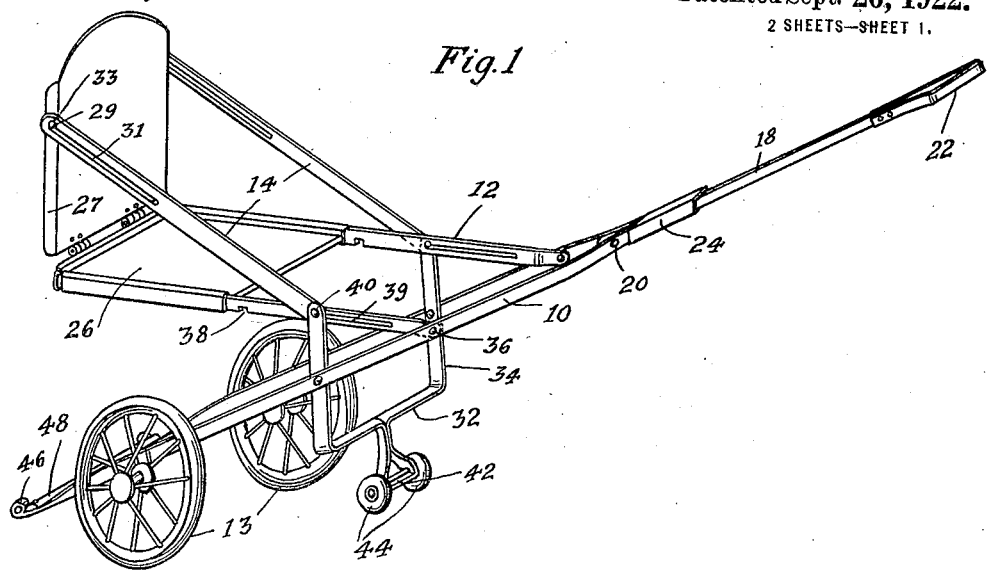
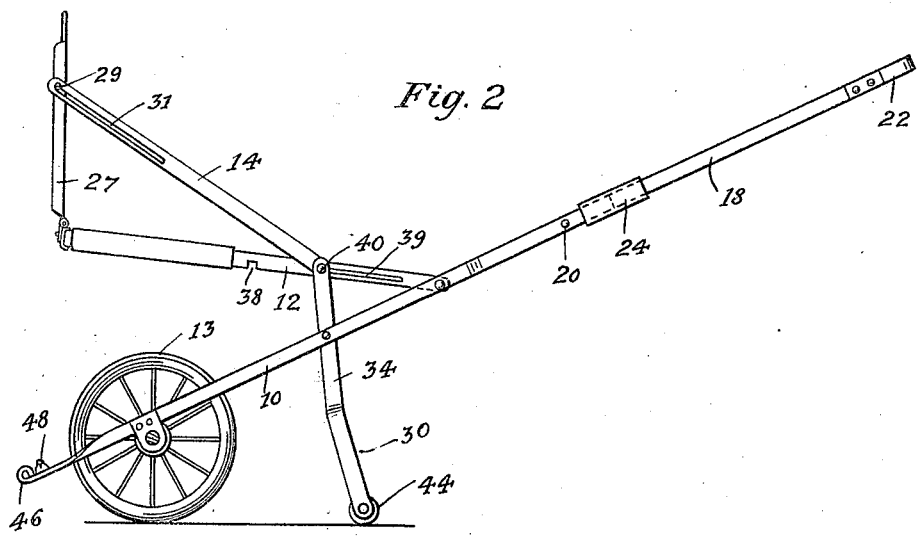

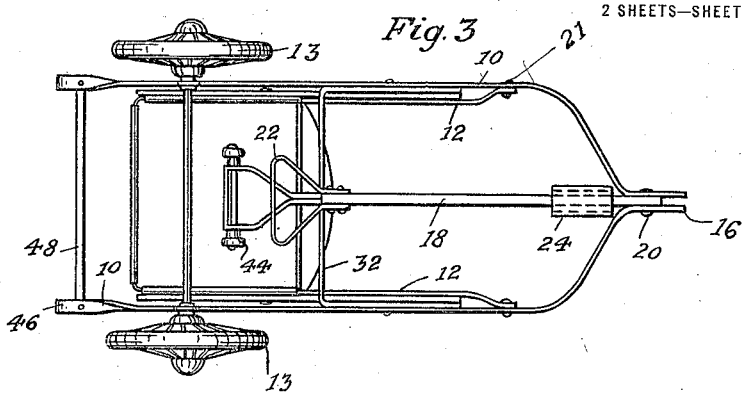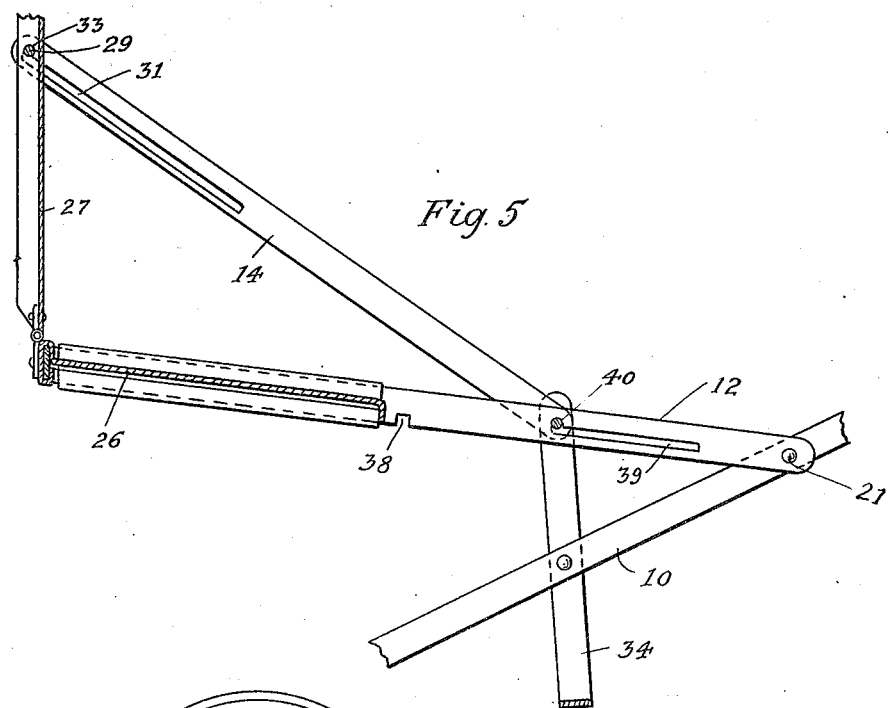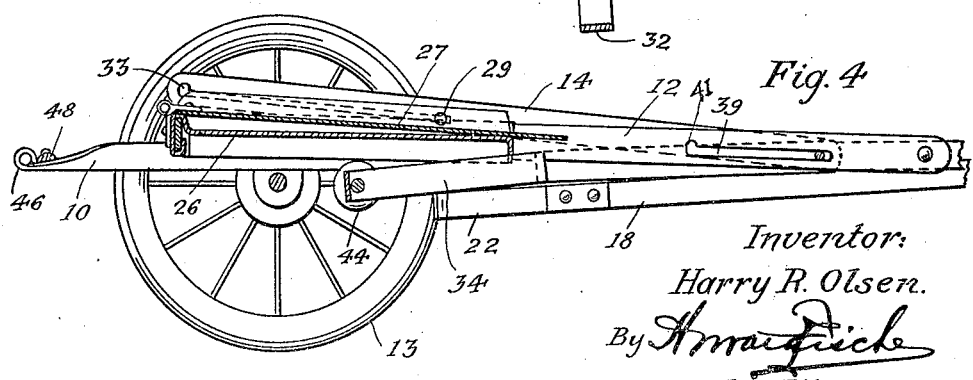

1,429,966

UNITED STATES PATENT OFFICE.

HARRY R. OLSEN, OF ST. PAUL, MINNESOTA.

COLLAPSIBLE GOCART.

Application filed December 27, 1920. Serial No. 433,227.

*To all whom it may concern:*

Be it known that I, HARRY R. OLSEN, a citizen of the United States, residing at St. Paul, in the county of Ramsey and State of Minnesota, have invented a new and useful Improvement in Collapsible Gocarts, of which the following is a specification.

My invention relates to collapsible carts of the two wheeled type and has for its object to provide a new improved cart which may be entirely constructed of metal and which is light and has a neat appearance.

Another object is to provide a device of this kind having folding parts which will permit the same being collapsed and extended with great rapidity. It is also an object to provide a device which is capable of being compactly folded into a flat form without any projecting parts so as to occupy very small space in order that the same may be conveniently carried hanging downward by the side.

In carrying out my invention I provide two wheel supporting bars to which are pivotally connected the seat supporting bars; and the arm rests pivoted to the seat supporting bars which may be easily collapsed toward the seat portion as the back rest is folded downward upon the seat. A further object is to provide a novel foot rest which automatically swings rear-ward underneath the seat, when the frame is collapsed and also to provide a handle which is arranged to be folded back either on top or underneath the seat portion.

The full objects and advantages of my invention will appear in connection with the detailed description thereof and are particularly pointed out in the claims.

In the drawings, illustrating the application of my invention in one form:—

Fig. 1 is a perspective view.

Fig. 2 is a side elevation of a collapsible cart constructed in accordance with my invention showing the frame members in extended position.

Fig. 3 is a top plan view of the cart showing the parts folded.

Fig. 4 is a side elevational view of the cart in collapsed position.

Fig. 5 is a detail view drawn to a larger scale of the seat supporting frame with parts broken away.

The opposite sides of the frame are similar in construction and each comprises a wheel carrying arm 10, a horizontal seat supporting bar 12, and a side bar or arm rest 14. A spindle 11 extends through downwardly projecting ears 17 secured to the wheel carrying arms 10, near the rear ends thereof on which the vehicle wheels 13 are mounted. The wheel carrying arms 10 are bent inwardly with their front ends 16 extended in parallel lines and approaching each other so as to form a pivotal support for the tongue 18 which is pivoted between the ends by means of a pin 20. The tongue or handle 18 preferably consists of a wooden bar and is provided at its outer end with a metallic handle 22. The tongue 18 is provided with a sleeve clamp 24 which is slidable and is adapted to cover the joint in the front end 16 to hold the tongue in fixed relation to the wheel carrying arms 10 when the cart is in use and may be moved inwardly on the tongue 18 to clear the front end 16 and allow the tongue to be folded either on top or beneath the seat when the cart is collapsed. The front ends of the seat supporting bars 12 are pivotally connected to the forward ends of the wheel carrying arms 10 by pins 21 and are adapted to swing towards and away from the wheel frame in the collapsing and extending operations.

The horizontal seat supporting bars 12 are connected together by a rectangular seat 26, preferably made of sheet metal, which extends to the rear of the bars 12.

27 is a back rest also preferably made of sheet metal hinged at its bottom edges to the rear edge of the seat 26. The rear ends of the side bars 14 are secured to the side edges of the back rest 27 near the top thereof by pins 29 which pass through slots 31 in the bars 14, the pins 29 sliding in the slots 31. Hence the back rest is adapted to be automatically folded upon the upper side of the seat so as to lie flat thereon when the cart is collapsed and is also adapted to be extended upwardly therefrom. The ends of the pins 29 are up-set to prevent the displacement of the bars 14. The slots 31 have notches 33 at their rear upper corners which may be engaged by the pins 29 to lock bars 14 in place when the back rest 27 is extended upwardly from the seat. The front ends of the side bars 14 are pivotally and slidably connected at 40 to the seat supporting arms 12 a short distance from the front ends thereof and are adapted to swing towards and from the wheel carrying arms in the collapsing and extending operations.

30 is a combined foot rest and support which is preferably constructed of a single metal bar having horizontal diverging arms 32 forming a foot rest for the child's feet, from which extend the vertical portions 34. The vertical portions 34 are pivoted near their lower ends at 36 to the wheel carrying arms 10 and at their upper ends to the side bars 14 by pivot pins 40, said pivot pins 40 also extending through slots 39 in the seat supporting bars 12. The foot rest in this way has a sliding connection with the seat supporting bars 12 for extending or collapsing the seat frame while the back rest 27 is at the same time swung away from or towards the seat frame and also forms a supporting brace between the wheel frame and the seat frame, when the cart is in extended position for use. The slots 39 have notches 41 at their rear upward corners which may be engaged by the pivotal pins 40 to lock the arms 34 of the foot rest in place to prevent their accidental displacement when the cart is in use. The support 30 is adapted to be extended downwardly from the frame so as to rest upon the ground when the cart is idle to prevent forward tilting of the same, and is also adapted for angular movement in a vertical plane, being automatically folded backward so as to lie against the bottom of the seat when the cart is collapsed. The seat supporting bars 12 are provided with notches 38 in which the arms 32 of the foot rest are adapted to be positioned when the cart is collapsed to permit the foot rest to be folded closer to the bottom of the seat. The lower end of the foot rest is provided with rollers 44 mounted upon a spindle 42 to enable the cart to be moved more easily when it is necessary to tilt the forward end of the cart upwardly as in going over a curb.

The wheel carrying arms 10 are extended rearwardly a short distance from the spindle 11 to form back stops 46 of the shape shown. The stops 46 are connected by bar 48 to make the wheel frame more rigid.

The operation and advantages of my invention will be obvious from the foregoing description. My device being simple in construction, the extending or collapsible operations can be performed with great rapidity. By swinging the back rest 27 backwardly, the seat frame and foot rest are automatically extended so as to place the cart in position for use. The cart is adapted to be folded into a flat compact form having no projecting parts to take up excessive room or to catch or tear clothes of the person carrying the same.

While I have herein shown and described what I now consider the preferred embodiment of my invention I will have it understood that minor changes may be made in the form, proportions and construction of the several parts without departing from the spirit of my invention and within the scope of the appended claims.

I claim:

1. A collapsible go cart comprising a wheel frame, a seat frame pivoted to said wheel frame, a seat back pivoted to said seat frame, brace members connected with said back, a foot rest pivoted at its center to said wheel frame and at its end to said brace members for collapsing said seat back.

2. A collapsible go-cart, the combination with a main frame having a handle on one end and bifurcated at the other end to form wheel supporting means, a seat frame pivotally connected at one end to the bifurcated end of said main frame, arm rests pivotally and slidably connected to said seat and back rest frames, and a foot rest pivoted to said main frame and to the inner end of said arm rests at the point of their pivotal and slidable connection with the said seat frame whereby said foot rest frame is adapted to move in a position to collapse said seat frame against the bifurcated end of said main frame when said foot rest frame is folded over to form a brace to support the free end of said frame away from said main frame to assume extended position for use.

3. A collapsible go-cart in combination with a main frame, one end of which is bifurcated, a handle pivoted to the other end in a manner to fold over onto either side of the bifurcated end when said cart is collapsed, means for locking said handle in a line with and in the same plane with said main frame, a seat supporting frame pivoted at one end to said main frame, a foot rest pivotally and slidably connected to said seat frame and pivotally connected with said main frame with its free end adapted to form a ground engaging support to hold the handle and the forward end of the main frame elevated into a position so that said seat frame assumes a position approximately parallel with the ground, and means for locking the pivoted and slidable end of said foot rest in a set position to said seat frame to hold the same extended and to form a supporting brace between the main frame and said seat frame.

4. A collapsible go-cart comprising a main frame adapted to extend in open position in a single plane, a handle pivoted to the forward end, means for locking the handle in operating position, a seat frame comprising a pair of parallel arms having one end pivoted to said main frame, a back rest pivotally connected to the other end of said seat frame, a foot rest frame adapted to form a support to hold the forward end of said main frame and handle extending upward, arm rests adapted to support said back rest, means for pivotally and slidably connecting said arm rest and foot rest with said seat frame and back rest in a manner to allow said back rest to fold forward on to said seat frame when said foot rest is folded beneath and between said main frame, said handle being adapted to fold over onto either side of said main frame.

5. A collapsible go-cart comprising a wheel frame, a seat frame, a seat back hinged at its lower end to the rear of said seat frame, brace members connected to said seat back slidably mounted in the forward end of said seat frame and means for sliding said brace members to collapse said seat back.

6. A collapsible go-cart comprising a wheel frame, a seat frame, a seat back hinged at its lower end to the rear of said seat frame, brace members connected to said seat back slidably mounted in the forward end of said seat frame and a foot rest pivoted to said brace members and to said wheel frame for sliding said brace members to collapse said seat back.

7. A child's collapsible go-cart including a frame adapted to support a pair of wheels, a seat frame adapted to fold against one side of said wheel frame, a back rest adapted to fold against said seat frame, a foot rest frame pivotally connected to said seat frame and wheel frame and adapted to fold against the other side of said wheel frame, and a handle pivotally connected to said wheel frame in a manner to fold onto either side of frame to collapse the cart into compact state.

8. A child's collapsible two-wheeled cart comprising a main frame, a seat frame directly pivoted to said main frame, a back rest pivoted to said seat frame, a foot rest pivoted to said seat frame and wheel frame in a manner to form a supporting brace therebetween, a ground engaging end formed on said foot rest adapted to prevent forward tilting of said cart and to directly support said seat when engaged on the ground, a pair of supporting arms adapted to pivotally and slidably connect said back rest and seat frame and to pivotally connect with one end of said foot rest, and means for locking said foot rest and back supporting arms in extended position.

9. A collapsible go-cart having a main frame comprising a bifurcated end adapted to form wheel supporting means, an operating handle pivotally connected to the forward end of said frame, a slidable locking means adapted to rigidly connect said handle in a straight line with said seat frame, said handle being adapted to be folded when unlocked onto either side of said frame, a seat frame adapted to fold onto one side of said main frame and a seat supporting frame pivotally and slidably connected to said seat frame and pivoted to said main frame adapted to fold onto the other side of said main frame and to form a foot rest to prevent forward tilting of said go-cart.

10. A collapsible go-cart comprising a main wheel supporting frame having a handle pivoted to the forward end in a manner to fold onto either side of said main frame when said cart is collapsed.

11. A collapsible go-cart comprising a wheel frame, a seat frame pivoted to said wheel frame, a foot rest pivoted to said wheel frame and means associated with said foot rest and longitudinally movable relative to said seat frame for elevating said seat frame upon movement of said foot rest.

12. A collapsible go-cart comprising a wheel frame, a seat frame pivoted to said wheel frame, a foot rest pivoted to said wheel frame and means slidable relative to said seat frame actuated by said foot rest for elevating the seat frame above the wheel frame.

13. A collapsible go-cart comprising a wheel frame, a seat frame pivoted to said wheel frame and provided with a pair of slots near the point of pivot to said wheel frame, a foot rest pivoted to said wheel frame, means for slidably connecting the ends of said foot rest to said slots in said seat frame, a seat back hinged at its lower end to the remote end of said seat frame, a pair of brace members pivoted to said foot rest at the point of connection to said slots of the seat frame, said brace members having a slidable connection with the ends of said seat back and means for locking said seat back and seat frame in its extended position in relation to said foot rest and brace members.

HARRY R. OLSEN.